United States Patent [19]
Rodenborn

[11] Patent Number: 5,168,947
[45] Date of Patent: Dec. 8, 1992

[54] MOTORIZED WALKER

[76] Inventor: Eugene P. Rodenborn, 1600 N. 13th St., Fort Dodge, Iowa 50501

[21] Appl. No.: 682,358

[22] Filed: Apr. 9, 1991

[51] Int. Cl.[5] .................. B62D 51/02; B62D 51/04
[52] U.S. Cl. ........................ 180/19.1; 180/208; 180/65.7; 482/68
[58] Field of Search .......... 180/19.1, 216, 220, 180/221, 208, 65.1, 65.7; 482/66, 68

[56] References Cited

U.S. PATENT DOCUMENTS

| | | | |
|---|---|---|---|
| 3,314,494 | 4/1967 | Weitzner | 180/208 |
| 3,872,945 | 3/1975 | Hickman et al. | 180/65 R |
| 3,985,082 | 10/1976 | Barac | 104/89 |
| 4,046,374 | 9/1977 | Breyley | 272/70.3 |
| 4,076,270 | 2/1978 | Winchell | 180/208 X |
| 4,087,108 | 5/1978 | Winchell | 180/208 X |
| 4,280,578 | 7/1981 | Perkins | 180/6.5 |
| 4,443,902 | 4/1984 | Baer | 5/81 B |
| 4,587,678 | 5/1986 | Love et al. | 4/251 |
| 4,643,695 | 2/1987 | Kennedy et al. | 180/65.7 X |
| 4,768,536 | 9/1988 | Hawkins | 135/67 |
| 4,802,542 | 2/1989 | Houston et al. | 180/65.5 |
| 4,874,055 | 10/1989 | Beer | 180/65.1 X |

FOREIGN PATENT DOCUMENTS

| | | | |
|---|---|---|---|
| 2624466 | 6/1989 | France | |
| 1545485 | 5/1979 | United Kingdom | |

Primary Examiner—Robert P. Olszewski
Assistant Examiner—Dean A. Reichard
Attorney, Agent, or Firm—Zarley, McKee, Thomte, Voorhees & Sease

[57] ABSTRACT

A motorized walker includes a base upon which a person can stand, with wheels on the base for rollably supporting the base. Variable speed reversible electric motors are provided for driving the wheels. A walker frame within which a person can stand is detachably mounted on the base, and includes control switches for separately and independently actuating the electric motors such that the person can stand on the motorized walker and maneuver it in any desired direction.

21 Claims, 2 Drawing Sheets

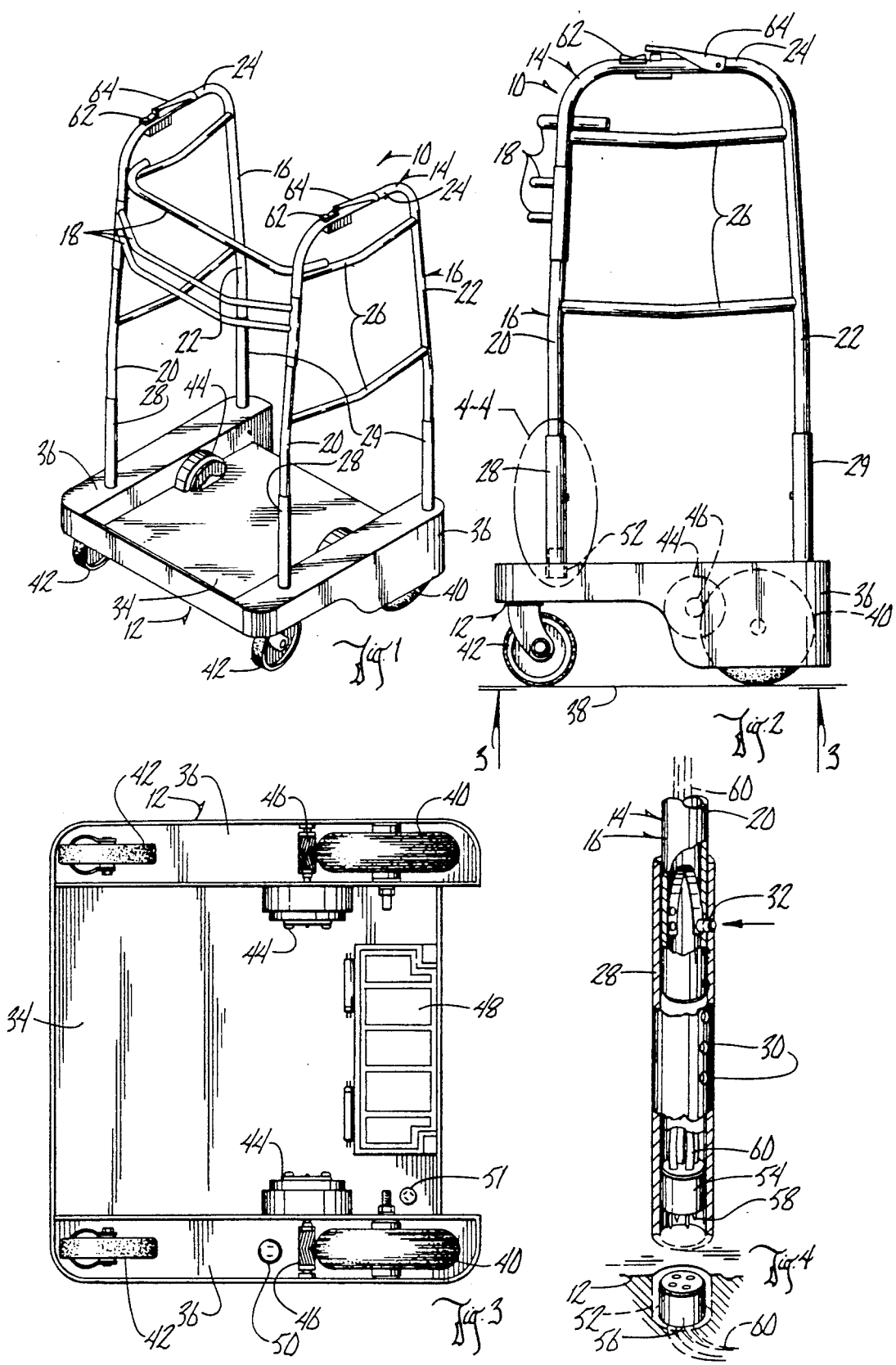

2

MOTORIZED WALKER

BACKGROUND OF THE INVENTION

Conventional walkers have been known for many years for use by people needing assistance in walking. For example, elderly individuals or people having medical problems which make walking difficult can use a walker to help walk short distances. However, strength and stamina limits the distances that such individuals can walk. Greater distances often require the use of a wheelchair, which may be motorized, or a powered scooter. It may be difficult for the person to sit down and stand up from the wheelchair or scooter. Also, when sitting in the wheelchair or scooter, the person is at a lower elevation than others who may be standing next to them. This sitting position can be depressing to the person, since the difference in elevation requires them to look up, and a standing person to look down, during a conversation. Furthermore, motorized wheelchairs and scooters are heavy, bulky, and difficult to transport in an automobile.

Therefore, a primary objective of the present invention is the provision of a motorized walker which is capable of carrying a person in a standing position.

Another objective of the present invention is the provision of a motorized walker which is easy to operate and maneuver.

A further objective of the present invention is the provision of a walker frame which is detachably mounted on a motorized base upon which a person can stand.

Yet another objective of the present invention is the provision of a motorized walker which can be quickly and easily disassembled for storage and for transportation in an automobile.

Another objective of the present invention is the provision of a motorized walker which is economical to manufacture, and safe and durable in use.

These and other objectives will become apparent from the following description of the invention.

SUMMARY OF THE INVENTION

The motorized walker of the present invention includes a base upon which a person can stand and a walker frame which partially surrounds the person. The frame is detachably mounted upon the base so that the person can use the frame in the same manner as a conventional walker. The base is mounted upon wheels which are driven by a pair of electric motors. Controls for each motor are provided in the walker frame and allow the wheels to be independently driven at variable speeds in both the forward and reverse directions. Thus, the motorized walker can be easily driven and maneuvered in any desired direction, including straight lines and turns.

The base includes recesses for receiving the lower ends of the walker frame legs. Two of the recesses and two of the legs have mating electrical connections so that upon mounting the frame on the base, the electric circuitry between the motors and controls is closed and the motorized walker is operable. Upon detachment from the base, the frame is foldable. Accordingly, the folded frame and base can be compactly stored or placed in an automobile for transportation. A rechargeable battery is provided for the variable speed, reversible electric motors. The height of the frame is also adjustable.

BRIEF DESCRIPTION OF THE DRAWINGS

FIG. 1 is a perspective view of the motorized walker of the present invention.

FIG. 2 is a side elevation view of the motorized walker.

FIG. 3 is a bottom plan view taken along lines 3—3 of FIG. 2.

FIG. 4 is a partial sectional perspective view taken along lines 4—4 of FIG. 3.

DETAILED DESCRIPTION OF THE DRAWINGS

Figure 5:
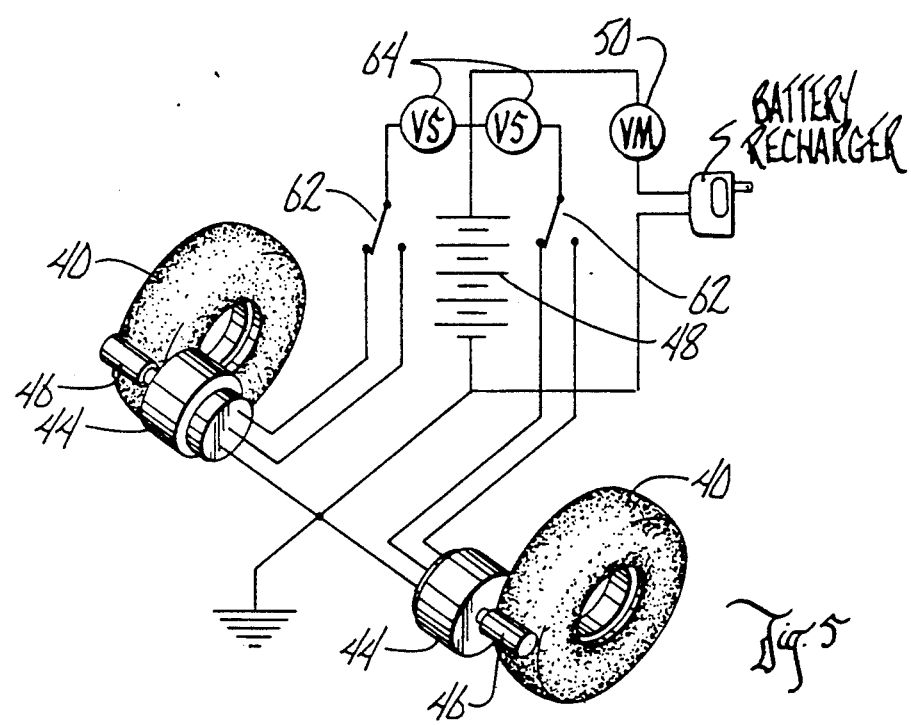
FIG. 5 is a schematic view showing the electrical circuitry of the present invention.

The motorized walker of the present invention is generally designated in the drawings by the reference numeral 10. The walker includes a base 12 and a frame 14. Frame 14 includes opposite U-shaped side members 16, which are interconnected by a plurality of cross braces 18, as best seen in FIG. 1.

Each side frame member 16 includes a forward leg 20 and a rearward leg 22 which are interconnected by a hand grip portion 24 at their upper ends. Additional structural braces 26 may also be provided. The lower end of each leg 20, 22 is slidably received within a collar 28, 29, respectively, having a plurality of apertures 30 therein. A spring loaded detent 32 is provided on each leg for receipt in one of the apertures 30, such that the height of the legs and hand grips is selectively adjustable relative to front collars 28 and rear collars 29.

Base 12 includes a main platform section 34 having a nonslip surface upon which a person can stand. On each side of main section 34 are wheel wells 36 which house the wheels which rollably support the base upon a support surface 38.

More particularly, the base includes a pair of drive wheels 40 rotatably mounted in the opposite wheel wells 36 toward the rearward edge of base 12 and a pair of caster wheels 42 mounted in the respective wheel wells 36 adjacent the forward edge of base 12. A variable speed, reversible electric motor 44 is provided for each drive wheel 40. Each motor 44 is securely fastened to the bottom of base 12 and includes a drive shaft 46 drivingly engaging the respective wheel 40, as best seen in FIG. 3. A battery 48 provides power to the motors 44. A volt meter 50 is operatively connected to battery 48 and is mounted in base 12 so as to be easily visible. An electrical connection 51 is provided for recharging battery 48.

As seen in FIGS. 2 and 3, the lower ends of front collars 28 and rear collars 29 are adapted to be received in a recess 52 on the upper surface of base 12. The front collars 28 each house an electrical male plug 54 which is adapted to electrically connect to a female outlet 56 housed within the front recesses 52. Electrical wires 60 extend from the prongs 58 of plug 54 upwardly through the hollow legs 20 for connection to a rocker-type forward/reverse switch 62 and a variable speed switch 64 mounted on each hand grip 24. The forward/reverse switch and variable speed switch on the left handle is separate and independent from the switches on the right handle, such that the left and right drive wheels 40, respectively, can be separately and independently controlled.

One example of a preferred electric motor is model U9FG d.c. Gearmotor with a 24:1 gear ratio manufactured by PMI Motion Technologies of Commack, N.Y. A preferred battery is the Cyclon monobloc lead gel 12 volt battery manufactured by Gates Energy Products in St. Paul, Minn. The preferred switches are manufactured by Cutler Hammer in Minneapolis, Minn., such as rocker switch Model No. B223J37FQ22M and speed control switch Model No. 8600K2.

In use, a person stands on the main platform portion 34 and grasps each hand grip 24. The forward/reverse switches are moved to the forward or reverse positions. The person then presses the variable speed switches 64 with their thumbs so as to control the speed and direction of the motorized walker 10. Since drive wheels 40 can be driven independently of one another in either the forward or reverse directions, the person can control and maneuver the walker 10 so as to go straight, turn corners, move around furniture, or rotate 360°.

If desired, frame 14 can be easily lifted from base 12 for use in the same manner as with a conventional walker. Also, cross braces 18 are connected to the opposite sides 16 in a conventional manner such that the frame can be folded for compact storage and for transportation in an automobile, along with detached base 12.

It is understood that modifications can be made to the structure of the present invention, and different motors, batteries, and switches can be utilized without departing from the scope of the present invention. However, from the foregoing, it can be seen that the present invention accomplishes at least all of the stated objectives.

What is claimed is:

1. A motorized walker comprising:
   a motorized base having a platform upon which a person stands and having wheels for rollably supporting the base on a support surface;
   a frame having spaced-apart, upright opposite sides between which a person can stand and having handles for gripping by the person, the sides being detachably mounted on the base;
   power means for driving the base and connected frame;
   control means on the frame for actuating the power means such that the person can ride from one location to another; and
   a pair of electrical circuits interconnecting the power means and control means, each circuit including male and female connectors, one of the connectors being on the frame and the other connector being on the base, the male and female connectors being coupled when the frame is mounted on the base.

2. The motorized walker of claim 1 wherein the wheels include a pair of drive wheels, and the power means includes first and second independent motors each being connected to one of the drive wheels whereby the drive wheels are rotatable independently of each other.

3. The motorized walker of claim 2 wherein the control means includes a pair of switch means, each being operatively connected to one of the motors for actuating the motors independently of one another.

4. The motorized walker of claim 3 wherein the motors are reversible whereby one motor can rotate one wheel forwardly while the other motor rotates the other wheel rearwardly such that the motorized walker can turn.

5. The motorized walker of claim 3 wherein the motors are variable speed whereby the wheels are rotatable at different speeds to turn the motorized walker.

6. The motorized walker of claim 3 wherein the switch means are mounted in the walker frame for actuation by the person's hands.

7. A motorized walker comprising:
   a base upon which a person can stand;
   wheels on the base for rollably supporting the base;
   power means for rotating at least one of the wheels;
   control means for actuating the power means;
   a walker frame having a pair of spaced-apart, upright opposite sides between which a person can stand and a handle portion on each side for gripping by a person, the sides being detachably mounted on the base;
   the wheels including a pair of drive wheels, and the power means including first and second independent motors each being connected to one of the drive wheels whereby the drive wheels are rotatable independently of each other; and
   the motors being variable speed and reversible electric motors, and the control means including a pair of switch means each connected to one of the motors for independently controlling the speed and direction of movement of the motorized walker.

8. The motorized walker of claim 7 further comprising a pair of electrical circuits each operatively connecting one switch means to the respective motor, each circuit including male and female electrical connectors, one of the connectors being on the walker frame and the other connector being on the base whereby upon mounting the walker frame on the base, the male and female connectors are coupled so as to close the electrical circuit.

9. The motorized walker of claim 8 wherein the walker frame has a plurality of legs with terminal ends, the ends of the legs of the walker frame being matingly received in corresponding recesses in the base.

10. The motorized walker of claim 9 wherein the one connector is recessed within the end of the leg and the other connector is mounted within the recess in the base, such that the connectors are protected from damage when the walker is detached from the base.

11. The motorized walker of claim 8 further comprises a battery for providing power to the motors.

12. A motorized walker comprising:
    a motorized base having a platform upon which a person stands and having wheels for rollably supporting the base on a support surface;
    a frame having spaced-apart, upright opposite sides between which a person can stand and having handles for gripping by the person, the sides being detachably mounted on the base;
    power means for driving the base and connected frame;
    control means on the frame for actuating the power means such that the person can ride from one location to another; and
    the sides of the frame having lower ends which are matingly received in corresponding recesses in the base.

13. The motorized walker of claim 12 wherein the frame is foldable and height adjustable.

14. The motorized walker of claim 12 wherein the wheels include a pair of drive wheels, and further comprising a pair of electric motors each being operatively connected to one of the drive wheels for independently driving the drive wheels.

15. The motorized walker of claim 14 further comprising an electric circuit for each motor, the circuit extending through the frame to one of the handles, and the circuit being closed only when the frame is mounted on the base.

16. The motorized walker of claim 15 wherein the control means includes switch means for each electric circuit, the switch means being mounted on the handles of the frame.

17. A motorized walker comprising:
- a motorized base having a platform upon which a person stands and having wheels for rollably supporting the base on a support surface;
- a frame having spaced-apart, upright opposite sides between which a person can stand and having handles for gripping by the person, the sides being detachably mounted on the base;
- power means for driving the base and connected frame;
- control means on the frame for actuating the power means such that the person can ride from one location to another;
- the wheels including a pair of drive wheels, and the power means comprising a pair of electric motors each being operatively connected to one of the drive wheels for independently driving the wheels; and
- an electric circuit for each motor, the circuit extending through the frame to one of the handles, and the circuit being closed only when the frame is mounted on the base.

18. The motorized walker of claim 17 wherein the frame includes left and right handles, the control means includes left and right switch means mounted on the left and right handles respectively, the base including left and right drive wheels and a motor for each drive wheel, whereby the person can manually and independently actuate the switch means for each motor to control thee speed and direction of rotation of each drive wheel.

19. The motorized walker of claim 17 wherein the sides of the frame have lower ends which are matingly received in corresponding recesses in the base.

20. The motorized walker of claim 17 further comprising a pair of electrical circuits interconnecting the power means and control means, each circuit including male and female connectors, one of the connectors being on the frame nd the other connector being on the base, the male and female connectors being coupled when the frame is mounted on the base.

21. A motorized walker comprising:
- a base upon which a person can stand;
- wheels on the base for rollably supporting the base;
- power means for rotating at least one of the wheels;
- control means for actuating the power means;
- a walker frame having a pair of spaced-apart, upright opposite sides between which a person can stand and a handle portion on each side for gripping by a person, the sides being detachably mounted on the base;
- the wheels including a pair of drive wheels, and the power means including first and second independent motors each being connected to one of the drive wheels whereby the drive wheels are rotatable independently of each other;
- the control means including a pair of switch means, each being operatively connected to one of the motors for actuating the motors independently of one another; and
- the motors being reversible whereby one motor can rotate one wheel forwardly while the other motor rotates the other wheel rearwardly such that the motorized walker can turn.

* * * * *